April 28, 1959 J. G. MASSELIN 2,884,519

SEARCH RECEIVER WITH STOP-ON-SIGNAL MEANS HAVING SAWTOOTH OSCILLATOR HALTED RESPONSIVE TO SIGNAL

Filed Dec. 6, 1956 2 Sheets-Sheet 1

INVENTOR:
JACQUES G. MASSELIN,
BY Michael Masnik
HIS AGENT.

INVENTOR:
JACQUES G. MASSELIN,
BY Michael Masnik
HIS AGENT.

2,884,519

SEARCH RECEIVER WITH STOP-ON-SIGNAL MEANS HAVING SAWTOOTH OSCILLATOR HALTED RESPONSIVE TO SIGNAL

Jacques G. Masselin, Paris, France, assignor to Compagnie Française Thomson-Houston, Paris, France Application December 6, 1956, Serial No. 626,749
Claims priority, application France December 8, 1955
4 Claims. (Cl. 250—20)

Figure 1:
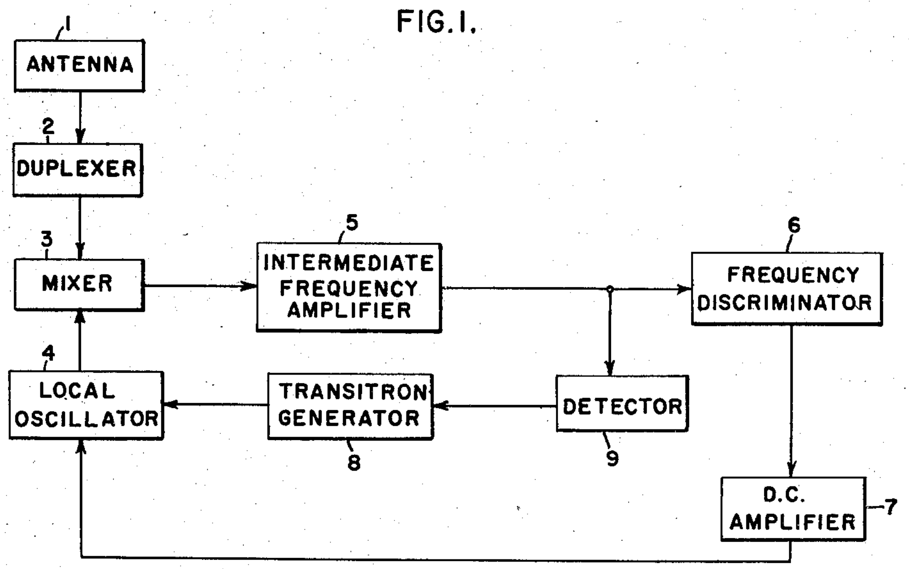

The present invention is concerned with electronic servo-mechanisms in which a certain physical quantity is maintained automatically equal to a reference quantity.

Such devices are used for the automatic control of intermediate frequency in the receivers of electromagnetic detection equipments, radar, whose local oscillator comprises a klystron.

In these devices, use is made of the fact that by causing the voltage between the reflector electrode of a klystron and its cathode to vary about a mean value, it is possible to modify for different operating conditions the operating frequency of this klystron by a given amount, the average value of this frequency being defined by regulating the resonant cavity.

In such radar receivers, the mixer produces a voltage of intermediate frequency obtained by "beating" the high frequency voltage of the received signals and the voltage supplied by the local oscillator. This mixer is followed by one of several intermediate frequency amplification stages. This amplification chain is connected to a frequency discriminator. The error voltage produced by this is applied to the input circuit of a D.-C. amplifier.

The amplified voltage serves to vary the potential difference between the reflector and the cathode of the klystron. The mean value of this latter voltage is previously adjusted when the discriminator voltage is zero.

In such a system of automatic frequency control, the supply voltages of certain tubes must be stabilized. The regulation of the klystron being part of the local oscillator must be so adjusted that the oscillator will function at the desired frequency and that it will "pick up." Finally, the system of automatic frequency control falls out of step when the radar repetition frequency is changed or when the frequency of the voltage generated by the local oscillator undergoes a relatively large drift.

These drawbacks are overcome by means of more complex systems. To have the automatic frequency control fall in step automatically, a sawtooth voltage is applied to the reflecting electrode of the klystron of the local oscillator when the intermediate frequency voltage is below a given level. This sawtooth voltage is generated by a transitron type circuit controlled by a detector whose input circuit is connected to the output of the intermediate frequency amplification chain.

Unfortunately, such a system uses a large number of tubes whose supply voltages have to be stabilized.

The automatic frequency control system proposed by the invention comprises only a relatively small number of tubes and their supply voltages do not have to be stabilized.

It is an object of this invention to provide an improved signal processing arrangement.

It is another object of this invention to provide an improved frequency control arrangement.

It is another object of this invention to provide an improved automatic frequency control arrangement for use in connection with the processing of electrical signals.

Briefly, one embodiment of the invention comprises mainly: a selective amplifier to which is applied the intermediate frequency voltage generated by the mixer of a radar receiver, for example a classical type oscillator, a rectifier and a relaxation oscillator.

The voltage produced by the selective amplifier controls the operation of the classical type oscillator, the amplitude of the oscillatory voltage decreasing when the amplitude of the amplified voltage increases. The oscillatory voltage is applied to a rectifier which produces a voltage used to vary the potential of the reflecting electrode of the klystron of the local oscillator with respect to its cathode, so as to maintain nearly constant the frequency of the voltage produced by the mixer.

When the output voltage of the selective amplifier is below a certain level, the voltage generated by the classical type oscillator releases the relaxation oscillator. The voltage of this oscillator is also used to vary greatly the reflector electrode of the klystron and causes it to operate at a frequency of the passing band of the selective amplifier. The amplitude of the variations of this voltage is determined in such a way that the local oscillator will pick up, regardless of the adjustment of the klystron cavity.

When the oscillator picks up under the above conditions, the voltage generated by the first classical type oscillator decreases and the relaxation oscillator ceases to function.

The voltage produced at the terminals of the system proposed by the invention is preferably used as a bias of the reflector electrode of the local oscillator klystron.

The relaxation oscillation may be of a very simple design, and preferably it consists of a neon tube which shunts part of the output resistance of the local oscillator.

Figure 2:
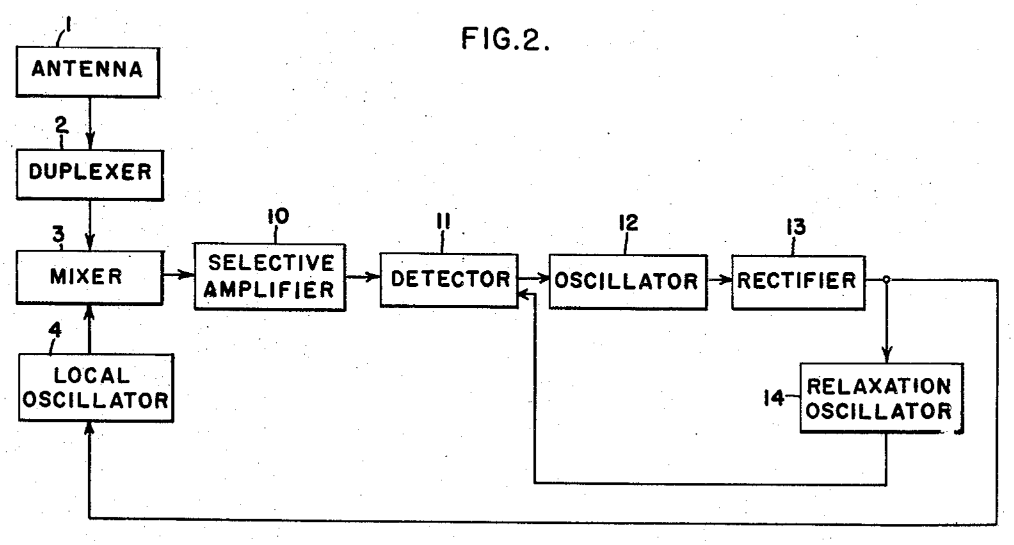
Figure 3:
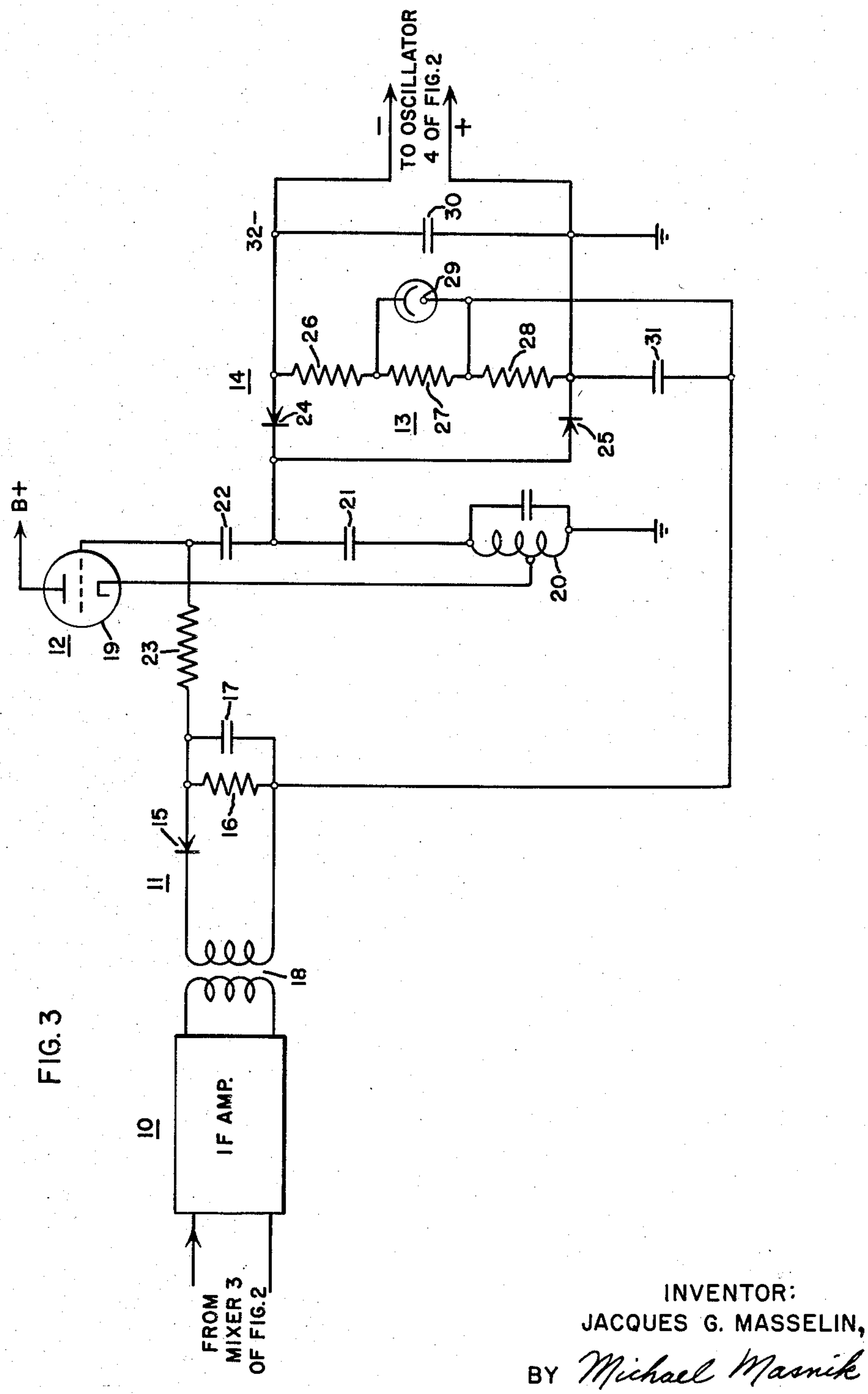

The novel features of the invention are illustrated in the accompanying drawings wherein:

Fig. 1 is a schematic diagram of the automatic control system of the intermediate frequency of a radar receiver according to the previous art. and Fig. 2 is a schematic diagram of an automatic frequency control system as proposed by the invention, and Fig. 3 is the circuit diagram of an automatic frequency control system shown schematically in Fig. 2.

In Fig. 1, the radar antenna 1 is connected to a duplexer 2, which in turn is connected to the input of the mixer 3. The local oscillator 4 comprises a klystron and is connected to the mixer. The intermediate frequency voltage produced by the mixer 3 is applied to the input of the amplifier 5, whose output circuit is connected to the input circuit of the frequency discriminator 6, which produces an error voltage. The latter is applied to the input of a D.-C. amplifier 7. The voltage produced by the amplifier 7 serves to vary the potential of the reflecting electrode of the klystron of the oscillator 4, with respect to the cathode potential, so as to reduce as much as possible the variations of the intermediate frequency.

It has already been explained that this type of automatic frequency control system has a tendency to fall out of step for various reasons, such as variations in the radar repetition frequency or drift of the emission frequency of this radar. To cause the automatic pickup of the system when the intermediate frequency voltage level is below a given value, a sawtooth voltage is applied to the reflecting electrode. This voltage is generated by a transitron type generator 8 controlled by the detector 9. The input circuit of the latter is connected to the amplifier 5 and the voltage produced by this detector is applied to the transitron 8, so as to release it when the level of the intermediate frequency voltage is practically zero.

It has already been explained that the system shown in Fig. 1 uses a relatively large number of tubes, and that the supply voltage of most of these tubes has to be stabilized.

Fig. 2 illustrates one embodiment of the present invention. Wherever possible, subject matter common to Figs. 1 and 2 has been identified in Fig. 2 with the same reference numerals. In Fig. 2 can be seen that the radar antenna 1 is connected to one of the input circuits of the mixer 3 through a duplexer 2. A local oscillator 4 comprising a klystron is connected to the mixer. The intermediate frequency voltage produced by the mixer 3 is applied to the input of a selective amplifier 10, whose output circuit is connected to the detector 11. One end of the output circuit of the detector is connected to the grid of tube of the classical type oscillator 12. The voltage generated by this oscillator is applied to the rectifier 13.

The rectified voltage applied over lead 15 to the local oscillator 4 serves to vary the potential of the reflecting electrode of the klystron of the local oscillator with respect to the cathode potential, so as to maintain practically constant the frequency of the voltage generated by the amplifier 10.

A fraction of this rectified voltage is applied to a relaxation oscillator 14 which operates when the level of the above voltage exceeds a certain value. The output resistance of the rectifier 11 and the output circuit of the relaxation oscillator 14 are so connected that the control voltage of the oscillator 12 is equal to the sum of a fraction of the voltage generated by the above relaxation oscillator 14 and the voltage detected by the circuit 11. This voltage generated by the oscillator 14 is used to vary the potential of the reflecting electrode of the klystron with respect to the cathode of the tube.

In normal operation, the voltage produced by the mixer having a frequency lying in the passing band of the amplifier 10, the voltage produced by the detector 11 lowers the potential of the grid of the tube of oscillator 12. The amplitude of the oscillations of this circuit 12 is thus the larger the lower the level of the output voltage of the selective amplifier 10. The rectifier 13 produces a direct voltage which serves, as already explained, to vary the potential of the reflecting electrode of the klystron of the oscillator 4 to correct the intermediate frequency of the output voltage of the mixer.

Then, as a result of the variation of the repetition frequency of the radar, or as a result of the emission frequency or the operating frequency of the local oscillator, the level of the voltage produced by the selective amplifier 10 drops quite far, the potential of the grid of the oscillator tube increases with respect to the cathode. The voltage produced by this oscillator also increases, the relaxation oscillator is released, and the voltage applied to the reflecting electrode of the klystron, or used to vary its potential, is variable.

The high frequency voltage produced by the klystron of the local oscillator is then frequency modulated. If, at a particular instant, the operating frequency of the klystron is such that the output voltage of the amplifier 10 has a sufficiently high level, the voltage produced by the rectifier 11 becomes large enough and the voltage across the ends of the output circuit of the oscillator 12 decreases.

The relaxation oscillator 14 then ceases to function. The voltage applied to the reflecting electrode of the klystron of the local oscillator 4 then becomes again a direct voltage.

The amplifier 10 must be sufficiently selective if the intermediate frequency is to remain practically constant.

Fig. 3 shows an example of the invention. The system shown in the drawing comprises the same essential elements as the system shown schematically in Fig. 2. These elements are designated by the same numbers in both figures.

The rectifier 11 comprises a diode 15 connected to a resistance 16 shunted by a capacitor 17. The selective amplifier 10 and the rectifier 11 are connected through a transformer 18.

The classical oscillator 12 consists of a triode 19 whose grid is connected to a resonant circuit 20 through two capacitors connected in series 21 and 22. The second end of the resonant circuit 20 is grounded. The filament of the tube 19 is connected to a tap of the inductance of the resonant circuit 20. The point which is common to the diode 15 and the resistance 16 is connected to the grid of the tube 19 through the resistance 23. The rectifier 13 is of the voltage-doubler type and consists of two diodes 24 and 25.

The output circuit of the rectifier has three resistances connected in series: 26, 27 and 28. The relaxation oscillator 14 consists mainly of a neon tube 29 whose electrodes are connected to the ends of the resistance 27.

The ends of the output circuit of the rectifier 13 are connected through the filter capacitor 30.

The point which the tube 29 and the resistance 28 have in common is connected directly to the end of the resistance 16, away from the diode 15. A capacitor 31 shunts the resistance 28.

The input of the amplifier 10 is connected to the output of the mixer 3. The negative output terminal 32 of the rectifier 13 is connected to the reflecting electrode of the klystron of the local oscillator.

The capacitor 22 causes the voltage transmitted to the rectifier 13 to be out of phase. The resulting phase angle is such as to prevent undesirable oscillations in the system of the servomechanism described.

It can be seen that when an intermediate frequency voltage is applied to the primary of the transformer 18, the potential of the end of the resistance next to the grid of the tube 19 becomes negative with respect to the other end of this resistance 16, the oscillator 12 tends to fall out of step.

The voltage produced by the rectifier 13 when the level of the intermediate frequency voltage applied to the primary of the transformer 18 drops below a certain level, as well as the values of the resistances 26, 27 and 28, must be such that a discharge takes place in the tube 29. A relatively high voltage will then appear across the terminals of the resistance 28 and the oscillator 12 can no longer function.

The capacitances of the various capacitors of the circuit, as well as its distributed capacitances and the values of the resistances must be such that the relaxation oscillators will set in when a discharge takes place in the tube 29.

The above system is very flexible, it permits the use of any of the modes of operation of the klystron of the local oscillator.

This automatic frequency control system permits the use of any of the two voltages obtained by "beating" the voltages applied to the input circuits of the mixer with the same sensitivity in both cases.

The principle underlying the system is applicable to many regulation systems. It makes it possible in particular to obtain generators which supply a stabilized direct voltage, the negative terminal of these generators being grounded.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. A system for the automatic control of the frequency of voltage produced by a device which mixes a high frequency voltage and an alternating voltage comprising a frequency selective amplifier for amplifying said produced voltage, an alternating signal generator, a normally inoperative relaxation oscillator, said oscillator rendered operative when the voltage amplified by said amplifier drops below a given value to produce a sweep wave, means for varying the amplitude of signals from said generator in accordance with said sweep wave to provide amplitude varied signals, means for rectifying said amplitude varied signals, and means for varying the frequency of said alternating voltage in accordance with the amplitude of said rectified signals, and said relaxation oscillator rendered inoperative as soon as the voltage amplified by said amplifier rises above said given value.

2. In combination, a source of electrical waves, a source of first oscillations, means for mixing said waves and oscillations to provide mixed waves, a frequency selective amplifier for amplifying said mixed waves to provide amplified waves, means for detecting said amplified waves to provide detected waves, a source of second oscillations, means for varying the amplitude of said second oscillations with said detected waves over a first range of amplitude levels of said amplified waves, a normally inoperative sweep signal generator rendered operative when said amplified waves fall below a given amplitude level to produce a sweep signal, means for varying the amplitude of said second oscillations in accordance with said sweep signal, means for rectifying said amplitude varied second oscillations to provide rectified signals, and means for controlling the frequency of said first source of local oscillations in accordance with the amplitude of said rectified signals.

3. In combination, a source of electrical waves, a source of first oscillations, means for mixing said waves and first oscillations to provide mixed waves, a frequency selective amplifier for amplifying said mixed waves to provide amplified waves, a source of second oscillations, a normally inoperative sweep signal generator rendered operative only when said amplified waves fall below a given amplitude level to produce a sweep signal, means for varying the amplitude of said second oscillations in accordance with said sweep signal, means for rectifying said amplitude varied second oscillations to provide rectified signals, and means for controlling the frequency of said first source of local oscillations in accordance with the amplitude of said rectified signals.

4. An automatic frequency control system for an arrangement comprising a source of first signals, a source of second signals and means for mixing said first and second signals to provide mixed signals, comprising a frequency selective amplifier for amplifying said mixed signals to provide amplified signals, a source of second signals, a normally inoperative sweep signal generator rendered operative when said amplified signals fall within a given range of amplitude levels to produce a sweep signal, means for varying the amplitude of said second signals in accordance with said sweep signal to provide varied amplitude second oscillations, and means for controlling the frequency of said first source of local oscillations in accordance with the amplitude of said varied amplitude second oscillations.

References Cited in the file of this patent

UNITED STATES PATENTS

| | | |
|---|---|---|
| 2,486,551 | Boothroyd | Nov. 1, 1949 |
| 2,783,383 | Robins | Feb. 26, 1957 |
| 2,798,946 | Howery et al. | July 9, 1957 |